Aug. 4, 1925.

J. J. LANE

FILTER

Filed Sept. 18, 1923

Inventor
J. J. Lane.
By
Lacey & Lacey, Attorneys

Patented Aug. 4, 1925.

1,548,271

UNITED STATES PATENT OFFICE.

JOHN JOSEPH LANE, OF BALTIMORE, MARYLAND.

FILTER.

Application filed September 18, 1923. Serial No. 663,445.

*To all whom it may concern:*

Be it known that I, JOHN J. LANE, citizen of the United States, residing at Baltimore, in the State of Maryland, have invented certain new and useful Improvements in Filters, of which the following is a specification.

This invention relates to an improved filter and seeks, among other objects, to provide a device of this character which may be employed in connection with a siphon tube and submerged in a jar or other vessel for filtering the contents of the vessel as such contents are siphoned therefrom.

The invention seeks, as a further object, to provide a filter of such efficiency that the filter may be positioned upon the bottom of the vessel so that practically all of the contents of the vessel may be withdrawn therefrom while any sediment in the bottom of the vessel will be effectually excluded.

And the invention seeks, as a still further object, to provide a filter which may be easily taken apart and cleaned.

Other and incidental objects will appear hereinafter.

In the drawings:—

Figure 1:
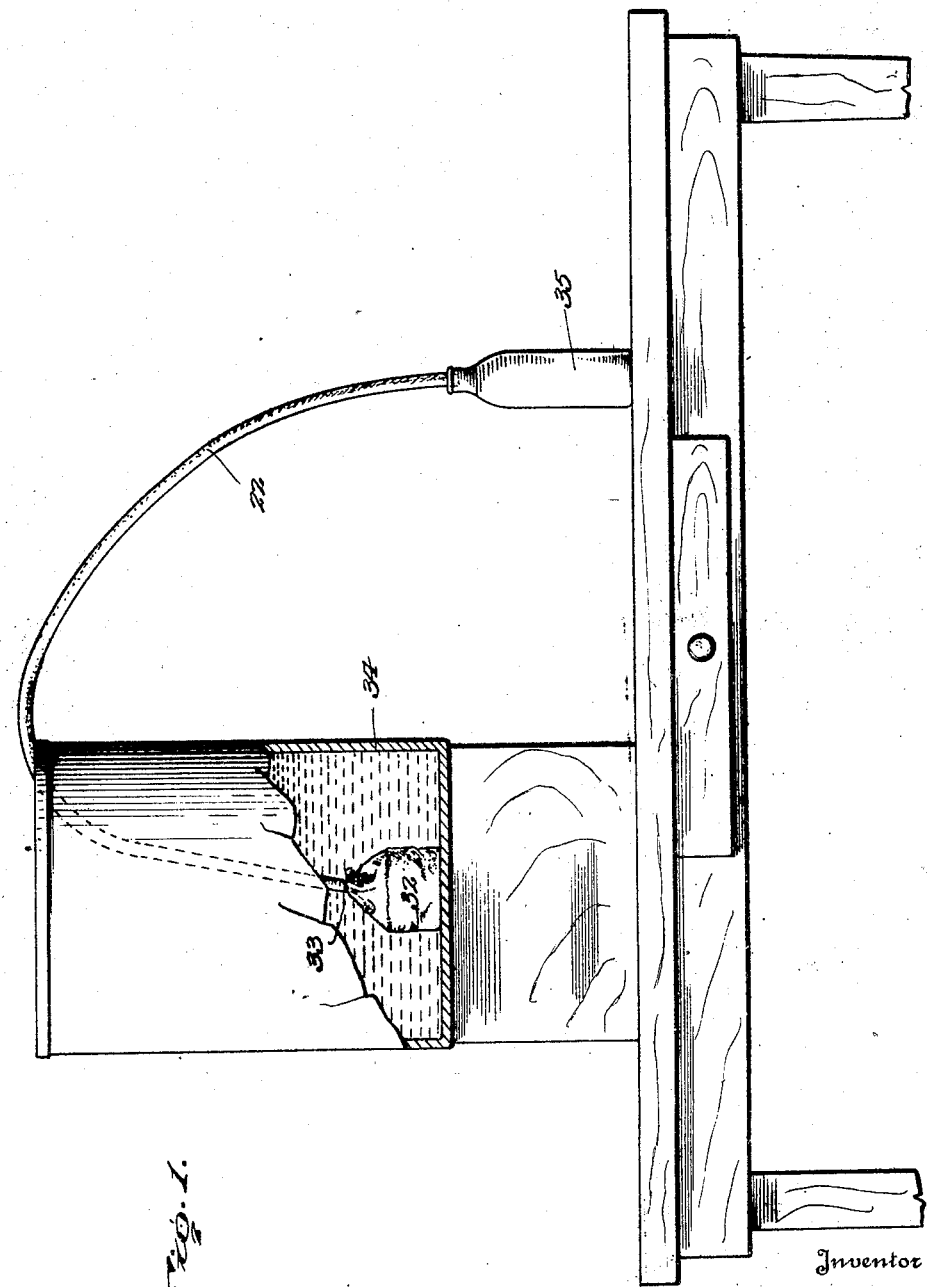
Figure 1 is an elevation showing my improved filter in use.
Figure 2:
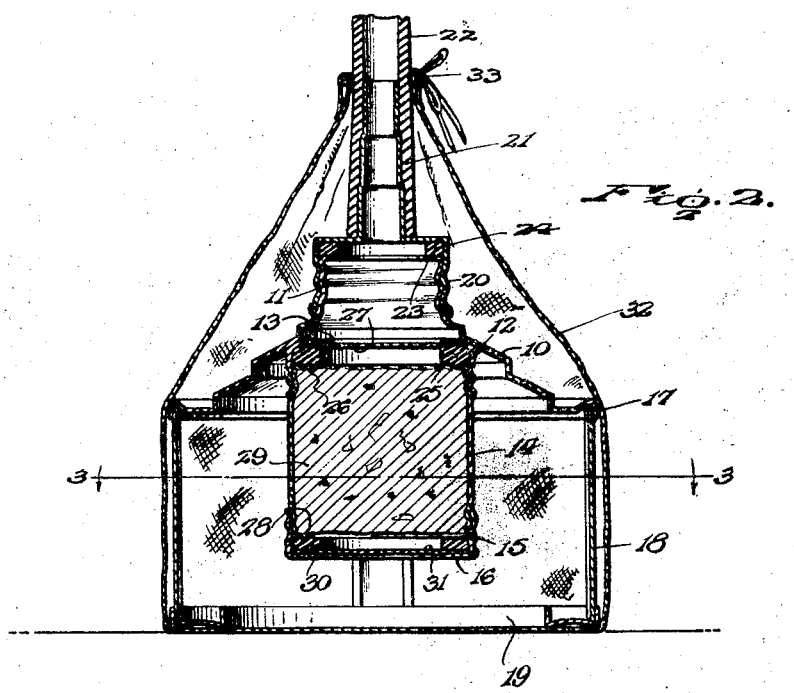
Figure 2 is a sectional view taken medially through the filter.
Figure 3:
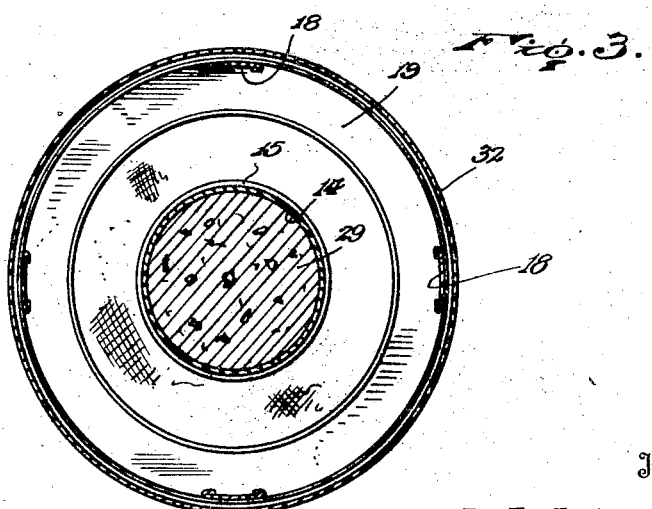
Figure 3 is a horizontal sectional view on the line 3—3 of Figure 2, looking in the direction of the arrows.

In carrying the invention into effect, I employ a filter casing embodying a conical end plate 10 terminating at its smaller end in a neck 11 and appropriately secured to the lower side of the plate at the base of the neck is a concentrically arranged ring 12 having an inwardly directed annular flange 13. Removably threaded into said ring is a cylindrical shell 14 and removably threaded upon the shell at its lower end is a clamping ring 15 having an inwardly directed annular flange 16 extending beneath the lower end edge of the shell. The end plate 10 of the casing overhangs the shell and is formed at its base end with a depending annular flange 17, and connected to said plate is a skeleton supporting frame embodying a plurality of strips or legs 18 soldered or otherwise secured at their free ends to the flange 17 while to the lower ends of said legs is similarly secured a channel-shaped base ring 19. Removably threaded upon the neck 11 of the filter casing is a cap 20 from which rises a preferably stepped outlet nipple 21, and removably engaged over said nipple is a siphon tube 22. Formed on the neck 11 at its upper end is an inwardly directed annular flange 23 and clamped between the cap and said flange is a yieldable gasket 24 forming a sealed joint between the cap and neck.

Fitting in the ring 12 of the filter casing is a yieldable gasket 25 and formed on the shell 14 at its upper end to coact with said gasket is an inwardly directed annular flange 26 while between the gasket and the flange 13 of said ring is interposed a filter cloth 27. Thus, as will be seen, the shell 14 may be adjusted upon the ring 12 to bind against the gasket so as to form a sealed joint between the shell and ring while the gasket will be compressed against the filter cloth for holding said cloth against accidental displacement. At its lower end, the shell is formed with a flange 28 similar to the flange 26 and confined within the shell between said flanges is a sponge 29. Interposed between the flange 28 of the shell and the flange 16 of the ring 15 is a yieldable gasket 30 and interposed between said gasket and the flange 16 is a filter cloth 31. Accordingly, the ring 15 may be adjusted upon the shell for compressing the gasket to form a tight joint between the ring and shell and clamping the filter cloth in place. Enclosing the filter casing is a cloth filter sack 32 fitting over the supporting frame of the casing and secured at its mouth tightly around the tube 22 by a draw string 33.

In Figure 1 of the drawings, I have shown my improved filter in use, a vessel being conventionally illustrated at 34 and an ordinary bottle at 35. As shown, the filter rests upon the bottom of the vessel and the tube is employed to siphon the contents of the vessel into the bottle. As the contents of the vessel are thus drawn through the filter, it will be seen that the fluid must first pass through the filter sack 32, which will serve to eliminate all heavier particles from the fluid. The fluid will then be drawn through the cloth 31 at the lower end of the filter casing which will serve to eliminate particles not excluded by the sack 32. The fluid will then, of course, be drawn through the sponge 29 to be further filtered by said sponge and then through the filter cloth 27 to be finally filtered by said cloth. Accordingly, all sediment or other particles will be effectually eliminated from the fluid so that the fluid will issue from the filter in a perfectly clear state. In this connection, it is to be noted that the supporting frame for the filter casing will support the lower end of said casing out of contact with the bottom of the vessel but close thereto. Accordingly, practically all of the contents of the vessel may be siphoned therefrom.

Having thus described the invention, what is claimed as new is:

1. A filter comprising a unit for disposal bodily within a container and including a shell having an inlet and an outlet, filtering means within the shell, a frame mounting the shell and extending below the inlet thereof to rest against the bottom of the container supporting said inlet above the bottom of the container, and a filtering sack enveloping the frame and shell for excluding heavier particles from said inlet, the sack being exposed for free removal.

2. A filter comprising a unit for disposal bodily within a container and including a shell having an inlet and an outlet, a sack enveloping the shell and forming the outer cover of the unit exposed directly to the contents of the container to provide a primary filtering means excluding the heavier particles of said contents, the sack being freely removable, and a secondary filtering means enclosed within the shell.

3. A filter comprising a unit for disposal bodily within a container and including a shell having an inlet and an outlet nipple, a frame mounting the shell and extending below the inlet thereof to rest against the bottom of the container supporting said inlet above the bottom of the container, a sack enveloping the frame and shell and provided at its mouth with a draw string tied around said nipple, the sack forming the outer cover of the unit exposed directly to the contents of the container to provide a primary filtering means excluding the heavier particles of said contents, and a secondary filtering means disposed within the shell.

4. A filter including a top plate provided centrally with a discharge neck, a ring fixed to the lower side of the plate at the base of said neck, an open-ended shell screwed at its upper end in said ring, a filter cloth clamped within the ring to overlie the adjacent end of the shell, a second ring screwed upon the lower end of the shell, a second filter cloth clamped within the latter ring to overlie the lower end of the shell, a filtering sponge disposed within the shell between said cloths, legs fixed to the top plate near its outer edge and extending below the lower end of the shell, and a base ring secured to and connecting the lower ends of the legs with each other.

5. A filter including a conical top plate provided with a discharge neck, an open-ended shell connected with said plate at the base of said neck and communicating with the neck, filtering means disposed within the shell, legs fixed to said top plate near the periphery thereof and extending below the lower end of said shell and a base ring secured to and connecting the lower ends of the legs with each other.

In testimony whereof I affix my signature.

JOHN JOSEPH LANE. [L. S.]